(12) United States Patent (10) Patent No.: US 12,567,147 B1

Pelluru et al. (45) Date of Patent: Mar. 3, 2026

(54) APPARATUS AND METHOD FOR CONTROL OF RESCANNING A SLIDE IN A GRAPHICAL USER INTERFACE

(71) Applicant: Pramana, Inc., Cambridge, MA (US)

(72) Inventors: Pavani Pallavi Pelluru, Pocharam (IN); Viral Pandey, Cambridge, MA (US); Raghubansh Bahadur Gupta, Bangalore (IN); Ramanjaneya Reddy, Bengaluru (IN); Sarvesh Kumar Thapa, Bengaluru (IN)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 19/072,148

(22) Filed: Mar. 6, 2025

(51) Int. Cl.
   *G06K 9/00* (2022.01)
   *G02B 21/36* (2006.01)
   *G06T 7/00* (2017.01)

(52) U.S. Cl.
   CPC .......... *G06T 7/0014* (2013.01); *G02B 21/365* (2013.01); *G06T 2207/10148* (2013.01)

(58) Field of Classification Search
   CPC ......... G06T 7/0014; G06T 2207/10148; G06T 2207/10056; G06T 2207/10061; G06T 2207/30024; G06T 7/50; G06T 7/529; G06T 7/564; G06T 7/571; G06T 5/003; G06T 5/004; G06T 7/13; G06T 7/90; G06T 7/0002; G06T 2207/30168; G06T 2200/24; G06T 11/60; G06T 11/206; G06T 11/203; G06T 2219/004; G02B 21/365; G06V 20/69–698; G06V 2201/04; G01N 15/1468; G01N 15/1475;

G01N 2015/1006; G01N 2015/1472; A61B 6/5258–5282; A61B 5/7203; H04N 23/631; G06F 3/0482; G06F 3/04845; G06F 3/04842; G06F 3/0481; G06F 3/04817; G06F 3/04815; G06F 3/04847; G06F 3/0485; G06F 3/04855; G06F 3/04812; G06F 3/048; G06F 3/0486; G06F 3/0483; G06F 3/0484

See application file for complete search history.

(56) References Cited

U.S. PATENT DOCUMENTS

| | | |
|---|---|---|
| 11,704,003 B2 | 7/2023 | Dailey et al. |
| 11,943,537 B2 | 3/2024 | Newberg et al. |
| 11,978,191 B1 | 5/2024 | Gangirevula et al. |
| 2014/0327687 A1 | 11/2014 | Murakami |

(Continued)

*Primary Examiner* — Atiba O Fitzpatrick

(74) *Attorney, Agent, or Firm* — Caldwell Intellectual Property Law

(57) ABSTRACT

An apparatus and method for control of rescanning a slide in a graphical user interface. The apparatus includes at least a processor and a memory communicatively connected to the processor configured to receive a first virtual slide from a scanning device, generate a display data structure, wherein generating the display data structure further comprises providing a plurality of visual elements associated with a plurality of events and at least an event handler, wherein a first visual element of the plurality of visual elements is associated with a first event of the plurality of events, a second visual element of the plurality of visual elements is associated with a second event comprising user input, and the second event configured to trigger a rescanning operation as a function of the user input, and display the first virtual slide.

20 Claims, 8 Drawing Sheets

600 ⟶

Receiving, Using At Least A Processor, A First Virtual Slide From A Scanning Device — 605

↓

Generating A Display Data Structure, Wherein Generating The Display Data Structure Further Comprises Providing A Plurality Of Visual Elements Associated With A Plurality Of Events And At Least An Event Handler, Wherein A First Visual Element Is Associated With A First Event, A Second Visual Element Is Associated With A Second Event Comprising User Input And The Second Event Is Configured To Trigger A Rescanning Operation Using The Scanning Device As A Function Of The User Input — 610

↓

Displaying, Using A Graphical User Interface Of A Display Device, The First Virtual Slide — 615

(56)  References Cited

U.S. PATENT DOCUMENTS

| | | | | |
|---|---|---|---|---|
| 2014/0362204 A1* | 12/2014 | Watanabe | ............ | G02B 21/365 |
| | | | | 382/133 |
| 2017/0270346 A1* | 9/2017 | Ascierto | ................ | G06V 20/69 |
| 2018/0253871 A1* | 9/2018 | Bredno | ................. | G06T 11/006 |
| 2019/0050980 A1* | 2/2019 | Liu | ......................... | G16H 30/20 |
| 2019/0323832 A1* | 10/2019 | Natori | ................ | G01B 11/2513 |
| 2022/0335582 A1* | 10/2022 | Isono | ......................... | G06T 5/40 |
| 2024/0233347 A1* | 7/2024 | Ba | ......................... | G06T 7/0012 |

* cited by examiner

Apparatus 100

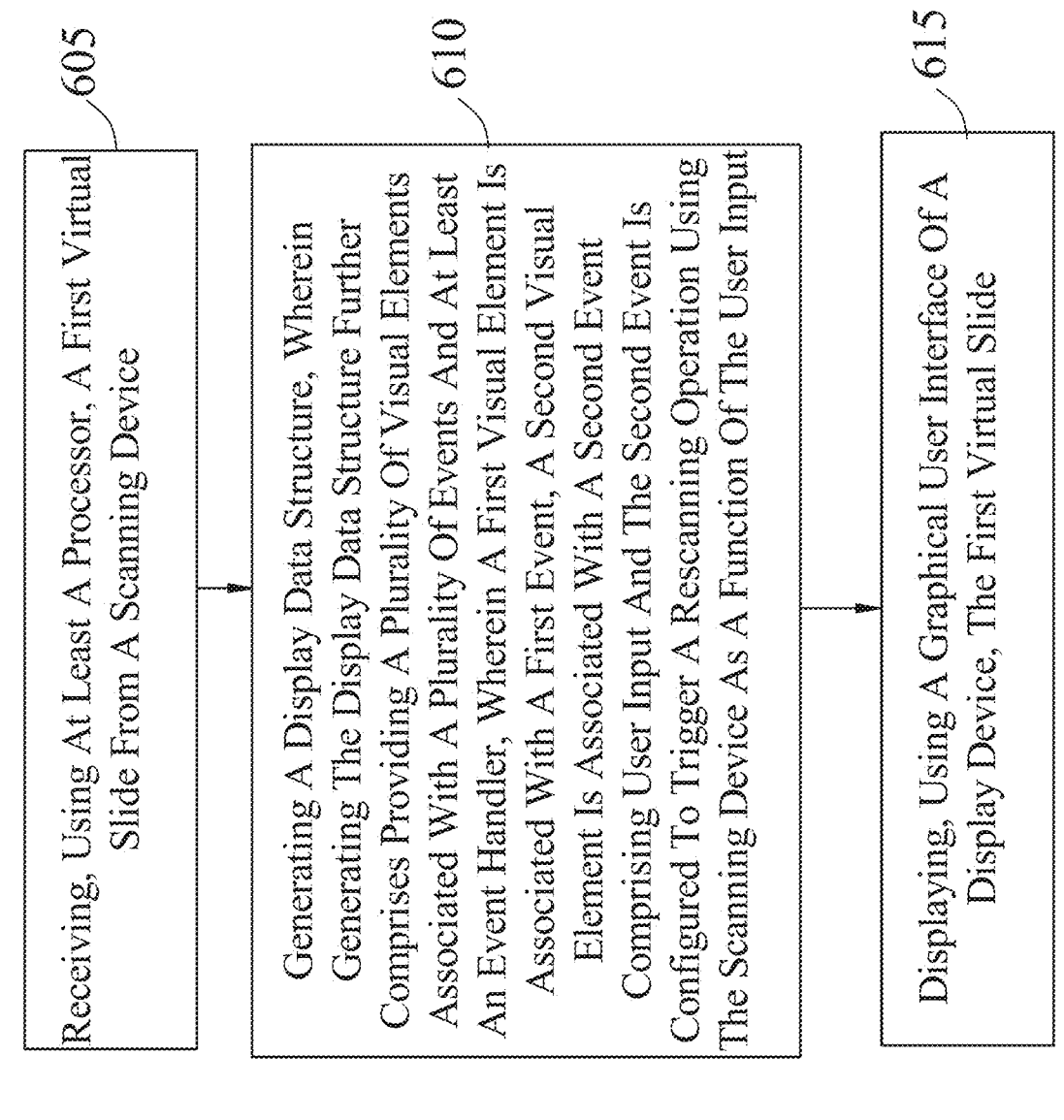

600

605

Receiving, Using At Least A Processor, A First Virtual Slide From A Scanning Device

610

Generating A Display Data Structure, Wherein Generating The Display Data Structure Further Comprises Providing A Plurality Of Visual Elements Associated With A Plurality Of Events And At Least An Event Handler, Wherein A First Visual Element Is Associated With A First Event, A Second Visual Element Is Associated With A Second Event Comprising User Input And The Second Event Is Configured To Trigger A Rescanning Operation Using The Scanning Device As A Function Of The User Input

615

Displaying, Using A Graphical User Interface Of A Display Device, The First Virtual Slide

FIG. 6

APPARATUS AND METHOD FOR CONTROL OF RESCANNING A SLIDE IN A GRAPHICAL USER INTERFACE

FIELD OF THE INVENTION

The present invention generally relates to the field of graphical user interfaces. In particular, the present invention is directed to an apparatus and a method for control of rescanning a slide in a graphical user interface.

BACKGROUND

Current systems for scanning slides often lack efficient mechanisms for identifying errors or inconsistencies in scanned images, making it challenging to initiate targeted rescanning operations. Additionally, these systems frequently fail to provide intuitive user interfaces for visualizing and comparing original and rescanned slides, leading to inefficiencies in error correction and quality control.

SUMMARY OF THE DISCLOSURE

In an aspect, an apparatus for control of rescanning a slide in a graphical user interface includes at least a processor and a memory communicatively connected to the at least a processor. The memory contains instructions configuring the processor to receive a first virtual slide from a scanning device, generate a display data structure, wherein generating the display data structure further comprises providing a plurality of visual elements associated with a plurality of events and at least an event handler, wherein a first visual element of the plurality of visual elements is associated with a first event of the plurality of events, a second visual element of the plurality of visual elements is associated with a second event comprising user input, and the second event is configured to trigger a rescanning operation using the scanning device as a function of the user input, generate, using the at least a processor, a modified display data structure based on the rescanned slide, and display, using the graphical user interface of the display device, the first virtual slide.

In another aspect, a method for control of rescanning a slide in a graphical user interface includes receiving, using at least a processor, a first virtual slide from a scanning device, generating a display data structure, wherein generating the display data structure further comprises providing a plurality of visual elements associated with a plurality of events and at least an event handler, wherein a first visual element of the plurality of visual elements is associated with a first event of the plurality of events, a second visual element of the plurality of visual elements is associated with a second event comprising user input and the second event is configured to trigger a rescanning operation using the scanning device as a function of the user input, and displaying, using a graphical user interface of a display device, the first virtual slide.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein:

FIG. 6 is a block diagram of an exemplary method for control of rescanning a slide in a graphical user interface.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for control of rescanning a slide in a graphical user interface. The apparatus includes at least a computing device comprised of a display device, wherein the display device displays a graphical user interface, a processor, and a memory communicatively connected to the processor. The memory instructs the processor to receive a first virtual slide from a scanning device. The processor generates a display data structure, wherein generating the display data structure further comprises providing a plurality of visual elements associated with a plurality of events and at least an event handler, wherein a first visual element of the plurality of visual elements is associated with a first event of the plurality of events, a second visual element of the plurality of visual elements is associated with a second event comprising user input, and the second event is configured to trigger a rescanning operation using the scanning device as a function of the user input. The processor generates a modified display data structure based on the rescanned slide. Additionally, the processor display, using the graphical user interface of the display device, the first virtual slide.

Figure 1:
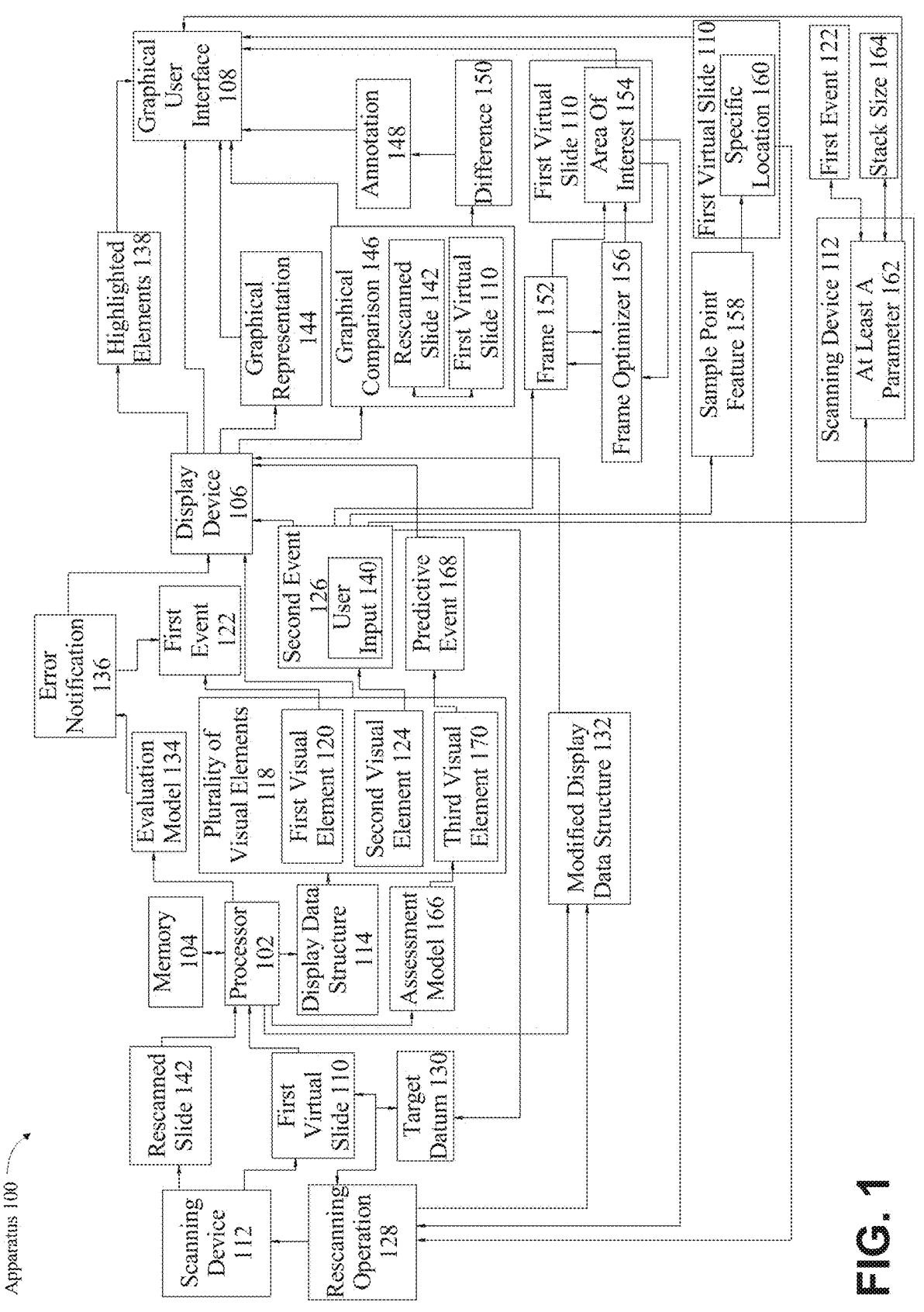
FIG. 1 is a block diagram of an apparatus for control of rescanning a slide in a graphical user interface.

Referring now to FIG. 1, an exemplary embodiment of apparatus 100 for control of rescanning a slide in a graphical user interface 108 is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to receive a first virtual slide 110 from a scanning device 112. As used in this disclosure, a "virtual slide" is a digital representation of a physical slide that captures image data for visualization, analysis, or processing t. In a non-limiting example, a virtual slide may be a high-resolution digital image of a pathology specimen prepared on a microscope slide, scanned using a whole slide imaging system. As used in this disclosure, a "scanning device" is a device configured to capture digital image data from a physical object by employing optical, mechanical, or electronic components to produce a digital representation of the physical object. In a non-limiting example, the scanning device 112 may include a whole slide scanner used in pathology to digitize glass microscope slides containing tissue samples, enabling virtual slide generation for remote diagnosis or archival purposes. In another non-limiting example, the scanning device 112 may include a fluorescence slide scanner designed to capture high-resolution images of slides prepared with fluorescently labeled biological specimens, allowing detailed examination of cellular or molecular markers in a clinical or research setting.

Still referring to FIG. 1, processor 102 is configured to generate a display data structure 114, wherein generating the display data structure 114 further comprises providing a plurality of visual elements 116 associated with a plurality of events and at least an event handler, wherein a first visual element 118 of the plurality of visual elements 116 is associated with a first event 120 of the plurality of events, a second visual element 122 of the plurality of visual elements 116 is associated with a second event 124 comprising user input 138, and the second event 124 is configured to trigger a rescanning operation 126 using the scanning device 112 as a function of the user input 140. As used in this disclosure, a "display data structure" is a specialized data structure that includes information related to visual elements 116 and their attributes for rendering and interaction within a graphical user interface 108. In a non-limiting example, a display data structure 114 may be created by a software application to represent the layout of a web page, including elements such as buttons, text fields, images, and their properties such as size, position, color, and visibility. The display data structure 114 may also include event handlers that define user interactions, such as clicks, hovers, or text inputs. In another non-limiting example, the display data structure 114 may be generated by a medical imaging application to visualize layers of a scanned pathology slide. The display data structure 114 may define areas of interest, annotation markers, or zoom levels to provide a detailed and interactive view of the slide. In an embodiment, without limitation, the display data structure 114 may be created dynamically by a processor when receiving data from a backend system. For instance, it could organize a series of diagnostic images into a carousel format with metadata such as patient ID, scan date, and diagnostic notes. Without limitation, the display data structure 114 may facilitate graphical comparisons. For example, in a slide rescanning system, it could represent both an initial scanned slide and a rescanned version, along with visual indicators such as, highlights or annotations that point out discrepancies or adjustments between the two slides. In a non-limiting scenario, the creation of a display data structure 114 may involve reading raw input data such as, JSON or XML files, parsing this data, and converting it into visual components by defining their placement, interactivity, and styling within the graphical user interface 108. An "event handler," as used in this disclosure, is a module, data structure, function, and/or routine that is configured to perform an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include any data transmitted to display device 106, client device, and/or graphical user interface 108. In some embodiments, visual element 116 may be interacted with. For example, visual element 116 may include an interface, such as a button or menu. In some embodiments, visual element 116 may be interacted with using a user device such as a smartphone, tablet, smartwatch, or computer. As used in this disclosure, a "display device" is an electronic device that visually presents information to an entity. In some cases, display device 106 may be configured to project or show visual content generated by computers, video devices, or other electronic mechanisms. In some cases, display device 106 may include a liquid crystal display (LCD), a cathode ray tube (CRT), a plasma display, a light emitting diode (LED) display, and any combinations thereof. In a non-limiting example, one or more display devices 106 may vary in size, resolution, technology, and functionality. Display device

106 may be able to show any data elements and/or visual elements 116 as listed above in various formats such as, textural, graphical, video among others, in either monochrome or color. Display device 106 may include, but is not limited to, a smartphone, tablet, laptop, monitor, tablet, and the like. Display device 106 may include a separate device that includes a transparent screen configured to display computer generated images and/or information. In some cases, display device 106 may be configured to present a graphical user interface 108 (GUI) to a user, wherein a user may interact with a GUI. In some cases, a user may view a GUI through display. A "graphical user interface," as used herein, is a graphical form of user interface that allows users to interact with electronic devices. In some embodiments, GUI 108 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Additionally, or alternatively, processor 102 be connected to display device 106. In one or more embodiments, transmitting the first virtual slide 110 may include displaying the first virtual slide 110 at display device 106 using a visual interface.

As used in this disclosure, an "event" is an interaction or condition associated with the graphical user interface. In some embodiments, an event may be associated with a corresponding visual element. In a non-limiting example, the interaction or condition may be monitored by the apparatus and may trigger operations or responses when detected. In an embodiment, the event may encompass both system-generated occurrences, such as notifications or error alerts, and user-initiated actions, such as selecting or manipulating elements within a graphical user interface 108. System-generated events may include occurrences such as an error notification 134 triggered by the scanning device 112 detecting an out-of-focus slide or identifying discrepancies in image quality, where the event is automatically associated with a visual element, such as a highlighted error indicator, within the graphical user interface 108. User-initiated events may include actions such as clicking, selecting, or dragging elements in the graphical user interface 108, such as defining an area of interest 152 on a slide or choosing a specific location 158 for rescanning. Without limitation, each event may be linked to a visual element, such as buttons, icons, or annotations, within a display data structure 114, and it is processed by an event handler, a component responsible for managing the corresponding system operation. For instance, without limitation, a user clicking on a rescan button, using a visual element, may trigger an event that initiates a rescanning operation 126. Similarly, a system error notification 134 event may trigger a visual update in the user interface, such as highlighting the affected region on the slide or displaying a message prompting the user to take corrective action. As used in this disclosure, "user input" is an interaction initiated by a user with the apparatus. In an embodiment, the user input 138 may include interactions such as selecting, clicking, typing, dragging, or otherwise engaging with visual elements 116 to control, modify, or provide data to the system. In an embodiment, the user input 138 may be received through the graphical user interface 108.

With continued reference to FIG. 1, as used in this disclosure, a "rescanning operation" is a process initiated by the apparatus or a user to re-capture or re-analyze a digital representation of a physical slide. In a non-limiting example, the rescanning operation 126 may be configured to address identified errors, improve image quality, or capture additional data based on a specified condition or user-defined input. In a non-limiting example, the rescanning operation 126 may be triggered when the system detects that the initial scan of a pathology slide is out of focus. Continuing, the rescanning operation 126 may adjust the focus parameters 160 of the scanning device 112 and re-capture the slide image to produce a sharper and more accurate digital representation. In another non-limiting example, a user may identify an area of interest 152 on a virtual slide using a graphical interface and select it for rescanning. Continuing, the rescanning operation 126 may then be executed by configuring the scanning device 112 to capture higher-resolution data for the specified area, providing detailed imagery for further analysis. In an embodiment, without limitation, the rescanning operation 126 may involve identifying discrepancies between an original scanned image and a target data model, such as missing tissue regions. The apparatus may automatically adjust the parameters 160 of the scanning device 112, such as exposure or magnification, and perform rescanning to capture the corrected or missing information. Continuing the previous non-limiting example, a rescanning operation 126 may also involve capturing additional layers of a slide when a depth-of-field issue is detected in the initial scan. The parameters 160 of the scanning device 112 may modify the stack size 162 or focus intervals to generate a layered or 3D representation of the slide. As used in this disclosure, a "target datum" is a predefined or dynamically generated reference value, condition, or set of criteria against which data is compared to determine the need for additional actions. In a non-limiting example, the target datum 128 may be a baseline image quality metric, such as resolution, brightness, or focus sharpness, established by the apparatus or the user for a scanned pathology slide. For example, if the initial scan does not meet this metric, the apparatus may trigger the rescanning operation 126 to improve the quality. In another non-limiting example, the target datum 128 may be a specific region of interest identified in a digital slide for diagnostic purposes. Without limitation, the apparatus may compare the digital slide to the target datum 128 and initiate rescanning if discrepancies, such as missing tissue sections or artifacts, are detected. In an embodiment, without limitation, the target datum 128 may represent a threshold value for fluorescence intensity in a scanned slide used in immunohistochemistry. Without limitation, if the fluorescence signal of the virtual slide falls below this value, the system adjusts scanning parameters 160, such as exposure time, and performs a rescanning operation 126 to achieve a more accurate representation.

With continued reference to FIG. 1, in a non-limiting example, rescanning operation may be consistent with one or more aspects of the scanning and/or rescanning operation described in U.S. patent application Ser. No. 19/050,842, filed on DATE Feb. 11, 2025, titled "APPARATUS AND METHOD FOR RESCAN WORKFLOW MANAGE-MENT IN AUTOMATED SCANNING SYSTEMS," which is incorporated by reference herein in its entirety.

With continued reference to FIG. 1, the target datum 128 may include a machine-learning model's predicted alignment of slide layers. For example, if the initial scan deviates from the predicted alignment, the apparatus may execute the rescanning operation 126 to correct the misalignment. In a non-limiting example, the machine-learning model used to predict alignment of slide layers may be trained using a supervised learning approach. The training process may include compiling a dataset of high-quality, manually annotated slide images, where each image includes labeled features such as tissue boundaries, layer alignment, and spatial relationships. The machine-learning model may learn to identify patterns and relationships within the training data by optimizing its predictions to match the annotations. In another non-limiting example, the training dataset may include examples of both well-aligned and misaligned slide layers, enabling the machine-learning model to recognize deviations and infer corrective adjustments. During training, the machine-learning model may use a combination of feature extraction techniques, such as convolutional neural networks (CNNs), to analyze spatial and structural details within the slides. Without limitation, the training process may also incorporate iterative refinement, where the machine-learning model's predictions are validated against a test dataset, and the weights are adjusted to improve accuracy. In an embodiment, without limitation, additional parameters 160 such as tissue type, staining characteristics, and slide scanner settings could be included in the training data to enhance the machine-learning model's generalization across various use cases. Further information regarding possible embodiments of the machine-learning model may be found in FIG. 3.

With continued reference to FIG. 1, the first event 120 may be received from an evaluation model 132, the first event 120 comprising an error notification 134, wherein the error notification 134 is presented in the graphical user interface 108 as highlighted elements 136. As used in this disclosure, an "evaluation model" is a computational model designed to analyze data to assess its quality, accuracy, or compliance with criteria. In some embodiments, the evaluation model may generate outputs that facilitate further processing or corrective actions by the apparatus. In a non-limiting example, the evaluation model 132 may be configured to analyze a scanned pathology slide for quality assessment. The evaluation model 132 may detect issues such as out-of-focus regions, uneven staining, or the presence of artifacts by comparing the scanned image to trained benchmarks of high-quality slides. If the evaluation model 132 identifies a region that falls below a predefined threshold for clarity or uniformity, the evaluation model 132 may generate an error notification 134, such as highlighting the affected area within the graphical user interface 108 and prompting a rescanning operation 126. In another non-limiting example, the evaluation model 132 may analyze a virtual slide for completeness by identifying missing tissue sections or improperly aligned layers. The evaluation model 132 may flag these discrepancies and trigger an automatic response, such as suggesting modifications to the scanning parameters 160 or notifying the user to take corrective action. In an embodiment, without limitation, the evaluation model 132 may assess fluorescence signal intensity in a scanned immunohistochemistry slide, detecting whether the signal falls within an expected range. If a deviation is identified, the evaluation model 132 may output recommendations for rescanning with adjusted exposure settings or signal amplification. As used in this disclosure, an "error notification" is a system-generated alert or message that indicates the detection of a deviation, deficiency, or issue in the operation or output of the apparatus. In a non-limiting example, the error notification 134 may include information related to a problem with the quality, alignment, or completeness of a scanned slide, and may be configured to provide visual, auditory, or other sensory feedback to prompt corrective actions or user awareness. In a non-limiting example, the error notification 134 may be generated by the apparatus when the evaluation model 132 detects that a scanned pathology slide contains an out-of-focus region. The error notification 134 may include as a highlighted box or annotation 146 over the affected area within the graphical user interface 108, accompanied by a text message such as "Focus Error Detected: Region requires rescanning." Without limitation, the error notification 134 may provide options for the user to adjust scanning parameters 160 or initiate an automated rescanning operation 126 to correct the issue. In a non-limiting example, the evaluation model 132 may incorporate an algorithm specifically designed to process image data from a virtual slide by analyzing pixel patterns, edge sharpness, or contrast levels to detect out-of-focus regions. Continuing, this type of algorithm may operate using predefined rules and thresholds to identify deviations from acceptable image quality, such as areas that lack sufficient detail or exhibit blur. Additionally and or alternatively, the evaluation model 132 may include a machine-learning model trained on a large dataset of labeled slide images. Without limitation, the training images may include examples of high-quality slides and slides with known issues, such as artifacts, alignment errors, or incomplete scans. The machine-learning model may use techniques like CNNs to learn intricate patterns and features associated with these issues. Once trained, the evaluation model 132 may evaluate new virtual slides by comparing their characteristics against the learned patterns and flagging discrepancies. For instance, the machine-learning component of the evaluation model 132 may recognize subtle staining inconsistencies that a rule-based algorithm may miss or classify complex alignment issues in multi-layered slides.

With continued reference to FIG. 1, as used in this disclosure, "highlighted elements" are regions, objects, or features within a graphical user interface that are emphasized through visual indicators. As used in this disclosure, "visual indicators" are graphical features or effects within the graphical user interface that are designed to emphasize, signal, or draw attention to specific regions, objects, or elements. In an embodiment, the highlighted elements 136 may include distinct visual styles such as color, brightness, borders, or annotations, to emphasize areas requiring user focus or corrective action. In a non-limiting example, highlighted elements 136 may include a specific region of a scanned pathology slide that is detected as being out of focus. Without limitation, the region may be visually emphasized within the graphical user interface 108 by overlaying a semi-transparent red rectangle to indicate the area requiring rescanning. In another non-limiting example, the error notification 134, such as a triangular warning symbol, may appear next to the file name of a problematic virtual slide in a list view, with the icon highlighted in bright yellow to signal an issue. In an embodiment, without limitation, the highlighted elements 136 may include text annotations, such as "Error: Misalignment Detected," displayed in bold red font within a side panel of the graphical user interface 108.

Continuing, visual markers such as green borders may surround successfully scanned regions, distinguishing them from the red-bordered problematic areas. Without limitation, a clickable button labeled "Rescan" may be highlighted with a flashing blue outline to direct user attention to corrective actions after an issue is identified. In an embodiment, the first event 120 may originate from the evaluation model 132 and may include the error notification 134, which indicates an issue detected during the analysis of the virtual slide. Continuing, the error notification 134 may be presented within the graphical user interface 108 as highlighted elements 136, which may visually emphasize the affected regions or components. For example, without limitation, the highlighted elements 136 may include a red-bordered rectangle over a specific area of the virtual slide that is out of focus, a yellow warning icon displayed in the interface, or a bold red text annotation stating "Focus Error Detected" in a side panel. Without limitation, the highlighted elements 136 may ensure that the user can easily identify and address the issue indicated by the first event 120.

With continued reference to FIG. 1, the second event 124 may include selecting, using a frame 150, an area of interest 152 of the first virtual slide 110 and triggering the rescanning operation 126 based on the area of interest 152. As used in this disclosure, a "frame" is a boundary or window within the graphical user interface 108 that defines a specific area of interest 152 on a virtual object, enabling the selection or isolation of that area for targeted operations. In a non-limiting example, the frame 150 may include a rectangular selection box that a user draws over a portion of a virtual slide using a mouse or touch input to indicate an area of interest 152, such as a region containing abnormal tissue. Continuing, the frame 150 may be used to trigger the rescanning operation 126 to capture higher-resolution imagery for the selected area. In another non-limiting example, the frame 150 may appear as a pre-defined window overlay in the graphical user interface 108, automatically highlighting regions flagged by the evaluation model 132 as problematic, such as areas with poor staining. Continuing, the user may confirm the location of the frame 150 and initiate the rescanning operation 126 to address the flagged issue. In an embodiment, without limitation, the frame 150 may be dynamically adjustable, allowing the user to resize or move it to refine the boundaries of the area of interest 152. For instance, without limitation, the user may expand the frame 150 to include additional tissue sections or reposition it to focus on a specific cellular structure before triggering the rescanning operation 126. In a non-limiting example, the frame 150 may include a selection boundary drawn in an irregular shape, such as a freeform outline created by the user using a stylus, mouse, and the like. Continuing, the freeform outline may allow the user to precisely define complex areas of interest on the virtual slide, such as tracing the perimeter of a tissue sample with unusual morphology. Continuing, once the irregular frame 150 is drawn, the frame 150 may be used to trigger a rescanning operation 126 that captures higher-resolution data specifically for the outlined region. In another non-limiting example, the frame 150 may automatically conform to the contours of a detected feature, such as a lesion or cluster of cells, based on input from the evaluation model 132. Without limitation, the frame 150 may be adaptive, with its irregular shape, and enable targeted rescanning without requiring manual adjustment by the user.

With continued reference to FIG. 1, as used in this disclosure, an "area of interest" is a specific region or portion of a virtual object selected for detailed analysis, processing, or rescanning. In an embodiment, the area of interest 152 may be defined by user input 138, such as a selection within a graphical user interface 108, or automatically identified by the system based on predefined criteria or model outputs. In an embodiment, without limitation, the area of interest 152 may include a region with inconsistent focus or poor image quality, such as a blurry corner of a scanned slide. Continuing, the area of interest 152 may be outlined automatically by the system or manually by the user to trigger the rescanning operation 126 for improved clarity. Continuing the previous non-limiting example, the area of interest 152 may include a specific structure, such as a blood vessel, gland, or cellular boundary, where detailed imaging is required to assess pathological conditions or measure biological parameters.

With continued reference to FIG. 1, wherein the processor 102 may further be configured to adjust the frame 150 using frame optimizer 154, wherein using the frame optimizer 154 comprises receiving the frame 150 and resizing the frame 150 as a function of the area of interest 152. As used in this disclosure, a "frame optimizer" is a component of the apparatus configured to refine, adjust, or resize a frame 150 based on a specific parameter. In an embodiment, the frame optimizer 154 may adjust or resize the frame 150, defining the area of interest 152, based on specific parameters 160 such as the characteristics of the selected region, user input 138, system-detected features, and the like, to ensure optimal targeting for subsequent operations, such as rescanning. In a non-limiting example, the frame optimizer 154 may receive an initial rectangular frame 150 drawn by the user over a region of a virtual slide and automatically resize the frame 150 to closely fit the contours of the tissue sample within the selected area of interest 152, ensuring precise targeting for a rescanning operation 126. In another non-limiting example, the frame optimizer 154 may adjust the size and shape of the frame 150 to match the boundaries of a cellular cluster detected by the evaluation model 132. For instance, without limitation, if the area of interest 152 contains irregularly shaped tissue, the frame optimizer 154 may reshape the frame 150 into a polygon that conforms to the tissue's outline, maximizing accuracy for rescanning. In an embodiment, without limitation, the frame optimizer 154 may resize the frame 150 based on system parameters 160, such as increasing the dimensions of the frame 150 to include additional surrounding regions flagged as potentially relevant by the evaluation model 132, ensuring no significant areas are excluded from the rescanning process. The frame optimizer 154 may refine the frame 150 by ensuring that it excludes irrelevant features, such as background or debris, to focus exclusively on the area of interest 152, improving the efficiency and accuracy of the rescanning operation 126.

With continued reference to FIG. 1, in a non-limiting example, frame 152 may be consistent with one or more aspects of the area of interest or content of interest described in U.S. patent application Ser. No. 18/736,818, filed on Jun. 7, 2024, titled "APPARATUS AND METHOD FOR DETECTING CONTENT OF INTEREST ON A SLIDE USING MACHINE LEARNING," which is incorporated by reference herein in its entirety.

With continued reference to FIG. 1, the frame optimizer 154 may be implemented as an algorithm that analyzes the pixel intensity, color contrast, or structural boundaries of the area of interest 152 within the frame 150 to resize it accordingly. For instance, the algorithm may use edge-detection techniques to ensure the frame 150 tightly conforms to the boundaries of a tissue sample, eliminating unnecessary empty space. In another non-limiting example, the frame optimizer 154 may be a machine-learning model trained on a dataset of annotated slide images to recognize patterns and features indicative of areas of interest. The frame optimizer 154 may dynamically adjust the frame size and shape based on its learned ability to differentiate relevant tissue from irrelevant background. In an embodiment, without limitation, the frame optimizer 154 could combine both approaches, where an algorithm identifies the basic boundaries of the area of interest 152, and a machine-learning model further refines the frame 150 by analyzing complex features, such as irregular morphology or subtle gradients in staining, to optimize the rescanning target.

With continued reference to FIG. 1, the second event 124 may include selecting, using a sample point feature 156 in the graphical user interface 108, a specific location 158 on the first virtual slide 110 and triggering, based on the sample point, the rescanning operation 126. As used in this disclosure, a "sample point feature" is a specific location 158 or coordinate on a virtual slide selected by a user or identified automatically by the apparatus, representing a focal point for further analysis, processing, or rescanning operation 126. As used in this disclosure, the sample point is a visual element within the graphical user interface 108 (GUI) that represents a specific location 158 on the virtual slide selected for targeted actions, such as rescanning. The sample point may take various visual forms to enhance user interaction and clarity. In a non-limiting example, the sample point may appear as a small, clickable pin icon resembling a map marker, placed on the virtual slide at the location selected by the user. The pin icon might include a tooltip or label displaying additional information, such as coordinates or a description of the identified feature such as, "Abnormal cell cluster." In another non-limiting example, the sample point may be represented as a colored dot, crosshair, or circle, visually distinct through its size, color, or animation. For instance, without limitation, the sample point may appear as a red crosshair to emphasize its importance, or as a pulsating blue dot to draw attention to the selected location. In an embodiment, without limitation, the sample point may include interactive features, such as being draggable by the user to refine the selected location or linked to a contextual menu offering options like "Rescan this region" or "Analyze further." Continuing the previous non-limiting example, the sample point may be highlighted dynamically, such as a green overlay circle expanding slightly around the point when selected, to indicate the scope of the rescanning operation 126 associated with that specific location 158.

With continued reference to FIG. 1, as used in this disclosure, a "specific location" is a precise point or defined area on a virtual slide identified by coordinates, a region marker, or other positional data, which serves as a reference for targeted actions such as analysis, annotation, or rescanning. In a non-limiting example, the sample point feature 156 may allow a user to click directly on a specific location 158 of a virtual slide, such as a darkly stained nucleus within a cluster of cells. The apparatus may record the coordinates of this location and trigger the rescanning operation 126 to capture higher-resolution data for the selected point, ensuring detailed analysis of the nucleus. In another non-limiting example, the sample point feature 156 may enable a user to mark a particular structure on the slide, such as the boundary of a suspected tumor. The user may use a cursor or touch input to designate the center of this structure as the specific location 158, prompting the system to focus the rescanning operation 126 on the region surrounding the marked point. In an embodiment, without limitation, the sample point feature 156 may involve selecting a pixel or small region flagged by the evaluation model 132 as abnormal, such as an area with inconsistent staining. For example, if the apparatus detects an unexpected signal in the fluorescence intensity, it may highlight the pixel as a specific location 158, and the user may confirm the rescanning operation 126 at this targeted site. Continuing the previous non-limiting example, the sample point feature 156 may support automatic identification of a specific location 158 by allowing the apparatus to select a key feature, such as a blood vessel or gland, based on predefined criteria or machine-learning predictions. The selected location becomes the focal point for the rescanning operation 126, ensuring the slide is re-imaged with the highest accuracy at the most critical areas.

With continued reference to FIG. 1, the rescanning operation 126 may include modifying at least a parameter 160 of the scanning device 112 as a function of the first event 120. As used in this disclosure, a "parameter" is a variable or configurable setting that influences the behavior, operation, or performance of a system component. In an embodiment, the parameters 160 may include values or thresholds related to focus, resolution, magnification, lighting, or other operational characteristics. In an embodiment, the rescanning operation 126 may include modifying at least a parameter 160 of the scanning device 112 as a function of the first event 120, where the first event 120 triggers adjustments to optimize the quality or accuracy of the rescanned slide 140. In a non-limiting example, the parameter may include the focus depth of the scanning device 112. For instance, without limitation, if the first event 120 detects an out-of-focus region on the initial slide, the apparatus may adjust the focus depth parameter to achieve sharper imaging during the rescanning operation 126. In another non-limiting example, the parameter may include the resolution setting of the scanning device 112. If the first event 120 identifies an area requiring detailed analysis, such as a suspicious lesion, the apparatus may increase the resolution to capture finer details during rescanning. In an embodiment, without limitation, the parameter may include the lighting intensity or exposure time of the scanning device 112. For example, if the first event 120 is a notification of inconsistent fluorescence signal strength, the system may adjust the exposure time to enhance signal clarity and reduce noise in the rescanned slide 140. Continuing the previous non-limiting example, the parameter may include the scanning speed. If the first event 120 highlights artifacts caused by rapid movement, the apparatus may slow the scanning speed to ensure more precise image acquisition during the rescanning operation 126.

With continued reference to FIG. 1, modifying the at least a parameter 160 of the scanning device 112 may include determining that the first virtual slide 110 is out of focus and adjusting, as a function of the first virtual slide 110 being out of focus, a stack size 162. As used in this disclosure, a "stack size" is the number of individual focal planes or layers captured by the scanning device 112 during a scanning operation, where each layer represents a specific depth of focus, and the stack size 162 determines the depth and resolution of the composite image. In a non-limiting example, the stack size 162 may initially be set to capture 10 focal planes for a tissue sample on a slide. If the first event 120 determines that the virtual slide is out of focus in certain areas, the stack size 162 may be increased to 20 focal planes to ensure that all regions of the tissue are imaged at optimal focus during the rescanning operation 126. In another non-limiting example, a stack size 162 of 5 layers may be used for a preliminary scan of a pathology slide. If the first event 120 identifies inconsistencies in the focus near thick or uneven tissue sections, the stack size 162 may be manually or automatically adjusted to 15 layers to create a higher-resolution composite image with improved depth of field. In an embodiment, without limitation, for fluorescence imaging, the stack size 162 may be set to 8 layers to minimize photobleaching during scanning. If the apparatus detects that critical structures, such as cells stained with a weak fluorescent signal, are out of focus, the stack size 162 may be expanded to 12 layers to capture the required detail while maintaining imaging quality. Continuing the previous non-limiting example, the stack size 162 may be dynamically adjusted based on the region of interest. For example, a smaller stack size 162 may be used for flat, uniform areas of a slide, while a larger stack size 162 is applied to areas with complex three-dimensional features, such as clusters of overlapping cells or folds in the tissue.

With continued reference to FIG. 1, In a non-limiting example, the stack size 162 may be changed by adjusting the scanning parameters 160 of the scanning device 112 to capture a different number of focal planes during the rescanning operation 126. Continuing, this adjustment may involve modifying the step size or interval between focal planes. For instance, without limitation, reducing the step size, such as from 5 microns to 2 microns, may increase the number of focal planes captured, allowing for greater detail and resolution in areas requiring precise focus. Additionally and or alternatively, increasing the depth range of the scan may add more layers to accommodate uneven or thick tissue sections, ensuring that the entire region is brought into focus. In another non-limiting example, the apparatus may dynamically adjust the stack size 162 based on feedback from the evaluation model 132. If the evaluation model 132 detects focus inconsistencies or artifacts in the initial scan, the scanning device 112 may automatically increase the number of focal planes for the affected areas. Additionally and or alternatively, the stack size 162 may be modified through user input 138, where a user selects a specific setting via the graphical user interface 108 to define the desired number of layers or depth range for the rescanning process. In an embodiment, without limitation, the adjustment of the stack size 162 may also be guided by an algorithm or a machine-learning model that analyzes the characteristics of the slide. For example, the algorithm may recommend a larger stack size 162 for dense or uneven tissue regions while maintaining a smaller stack size 162 for flat or uniform areas. Without limitation, the methods may provide flexibility and precision in adapting the stack size 162 to achieve optimal imaging results during rescanning operations 126.

Still referring to FIG. 1, processor 102 is configured to generate a modified display data structure 130 based on the rescanned slide 140. As used in this disclosure, a "modified display data structure" is a data structure generated by the apparatus that represents updated or altered visual and interactive elements within the graphical user interface 108, reflecting changes made as a result of new data. In an embodiment, the new data may include a rescanned slide 140, user interactions, and the like. In a non-limiting example, a modified display data structure 130 may represent a virtual slide updated with new image data after a rescanning operation 126. For instance, without limitation, the display data structure 114 may have shown a blurry or incomplete region, and the modified display data structure 130 incorporates the newly rescanned image, replacing the problematic region with a sharper, higher-resolution section. In another non-limiting example, the modified display data structure 130 may include additional annotations generated after the rescanning operation 126. For example, the apparatus may add highlighted areas or labels to indicate differences between the original scan and the rescanned image, such as regions with improved focus or corrected alignment. In an embodiment, without limitation, the modified display data structure 130 may reorganize the layout of visual elements 116 in the graphical user interface 108. For instance, without limitation, a comparison view may be created, dividing the display to show both the original and rescanned slides 140 side by side, along with color-coded markers highlighting discrepancies detected between the two images. Continuing the previous non-limiting example, the modified display data structure 130 may include a newly generated summary panel displaying metrics related to the rescanned slide 140, such as scores, parameters 160 adjusted during rescanning, or additional information generated by an evaluation model 132. Without limitation, the modified display structure may ensure that the graphical user interface 108 provides a clear and interactive representation of the most recent data.

With continued reference to FIG. 1, as used in this disclosure, "scores" are numerical or categorical metrics generated by the apparatus that quantify the quality, accuracy, or completeness of a data, based on predefined criteria. In a non-limiting example, the score may be a numerical value ranging from 0 to 100. Continuing, a score of 100 may indicate a perfectly focused and uniformly scanned slide. Without limitation, if a scanned slide receives a score of 75, it may suggest minor focus issues or staining inconsistencies that require further evaluation or rescanning. In another non-limiting example, the score may be assigned to specific regions of a virtual slide. For instance, a section of the slide containing dense tissue may receive a score of 90 due to good focus and resolution, while another section with uneven staining or artifacts may score only 65, prompting a rescanning operation 126 for that area. In an embodiment, without limitation, the score may be expressed as a categorical metric, such as "Excellent," "Good," "Fair," or "Poor," based on predefined thresholds. For example, a slide categorized as "Fair" may indicate that the image is usable but could benefit from rescanning certain regions to improve diagnostic accuracy. Continuing the previous non-limiting example, scores may also be multi-dimensional, representing different attributes separately. For instance, a slide might receive a focus score of 95, a resolution score of 85, and a staining uniformity score of 70. Without limitation, these detailed scores may provide a comprehensive view of slide quality, helping to pinpoint specific areas for improvement during rescanning operations 126.

With continued reference to FIG. 1, the apparatus may be configured to generate the modified display data structure 130 based on a rescanned slide 140, wherein the modified display data structure 130 comprises receiving, using the at least a processor, the rescanned slide 140 from the scanning device 112 and providing a graphical representation 142 of the rescanned slide 140 within the graphical user interface 108. As used in this disclosure, a "rescanned slide" is a digital representation of a physical slide that has been re-captured by a scanning device 112 following an initial scan. In an embodiment, the first virtual slide 110 may be rescanned by the scanning device 112 to address quality issues, incorporate user-specified adjustments, capture additional details for improved analysis or visualization, and the like. In a non-limiting example, the rescanned slide 140 may exhibit improved image quality compared to the original scan, such as sharper focus in previously blurry regions or enhanced resolution in areas requiring detailed analysis. For instance, without limitation, the rescanned slide 140 may reveal fine cellular structures in a pathology specimen that were obscured in the initial scan due to misalignment or insufficient focal depth. In another non-limiting example, the rescanned slide 140 may include additional layers or focal planes, capturing a greater depth of field to visualize three-dimensional tissue structures more clearly. For example, without limitation, the rescanned slide 140 of a thick specimen may display both surface details and deeper layers, providing a more comprehensive view for diagnostic purposes. In an embodiment, without limitation, the rescanned slide 140 may integrate user-defined adjustments, such as focusing on a specific area of interest 152 or applying modified scanning parameters 160 like increased brightness, contrast, or exposure time. Continuing, these enhancements may make the rescanned slide 140 a refined version tailored to meet specific analytical needs. Continuing the previous non-limiting example, the rescanned slide 140 may include updates in annotations or overlays, such as highlighted regions of interest or error markers that have been resolved, ensuring the user interface accurately represents the most current and actionable.

With continued reference to FIG. 1, as used in this disclosure, a "graphical representation" is a visual depiction of data, objects, or information rendered within a graphical user interface 108. In an embodiment, the graphical representation 142 may include images, charts, diagrams, icons, or other visual elements 116 designed to facilitate user interaction, analysis, or understanding. In a non-limiting example, the graphical representation 142 of the rescanned slide 140 within the modified display data structure 130 may be a high-resolution digital image of the updated slide displayed in the graphical user interface 108. Without limitation, the graphical representation 142 might include interactive zoom and pan features, allowing the user to closely examine the corrected regions that were out of focus in the initial scan. In another non-limiting example, the graphical representation 142 may incorporate side-by-side comparison views of the first virtual slide 110 and the rescanned slide 140. Continuing, each view may include annotations, such as colored overlays or labels, that highlight regions where the rescanned slide 140 has improved quality or resolved specific issues. In an embodiment, without limitation, the graphical representation 142 may include a heatmap overlay applied to the rescanned slide 140, indicating areas of high diagnostic relevance or regions that were adjusted during the rescanning operation 126. For instance, without limitation, the heatmap may use a gradient of colors such as, blue to red, to show the focus improvements across different regions. Without limitation, the graphical representation 142 may provide a three-dimensional reconstruction of the rescanned slide 140, created by stacking multiple focal planes captured during the rescanning operation 126. Continuing, the 3D view may enable the user to visualize tissue structures in layers, enhancing diagnostic capabilities.

With continued reference to FIG. 1, the modified display data structure 130 may include generating a graphical comparison 144 of the rescanned slide 140 and the first virtual slide 110 and identifying, using an annotation 146 of the plurality of visual elements 116, a difference 148 between the rescanned slide 140 and the first virtual slide 110. As used in this disclosure, a "graphical comparison" is a visual representation within a graphical user interface 108 that juxtaposes or overlays two or more datasets, images, or elements. In an embodiment, the graphical comparison 144 may include a visualization comparison of the first virtual slide 110 and the rescanned slide 140, to highlight similarities, differences, changes, and the like, using annotations, color coding, or other visual indicators. As used in this disclosure, an "annotation" is a visual or textual marker added to a graphical representation 142 to highlight, label, or provide additional information about specific features, regions, or data points. In an embodiment, the annotation 146 may facilitate analysis, understanding, or interaction of the first virtual slide 110 and/or the rescanned slide 140 within the graphical user interface 108. The graphical comparison 144 may include various techniques, such as displaying the two slides side by side within the graphical user interface 108 or overlaying one slide onto the other with adjustable transparency. The graphical comparison 144 may include annotations 146 that mark specific differences between the rescanned slide 140 and the first virtual slide 110. For example, areas of improved focus or alignment on the rescanned slide 140 may be outlined with a green border, while regions still requiring attention might be highlighted with a red circle. In another non-limiting example, the annotation 146 may provide textual labels, such as "Focus Enhanced" or "Staining Artifact Removed," directly on the graphical comparison 144 to describe the nature of the identified differences. Continuing, the annotations 146 may appear dynamically when a user hovers over or clicks on the annotation 146. In an embodiment, without limitation, the graphical comparison 144 may include a difference map, where changes between the slides are color-coded on a composite image. For instance, added detail from the rescanning operation 126 may appear as shaded regions in blue, while eliminated errors, such as artifacts, might be indicated in yellow. Without limitation, this may allow users to quickly assess the effectiveness of the rescanning operation 126 and identify any remaining discrepancies.

Still referring to FIG. 1, processor 102 is configured to display, using the graphical user interface 108 of the display device 106, the first virtual slide 110. Without limitation, this display may include the full-resolution image of the first virtual slide 110, allowing users to pan, zoom, and interact with specific regions for detailed examination. In a non-limiting example, the graphical user interface 108 may provide navigation tools, such as a thumbnail overview or scrollable navigation bar, to help users move across different sections of the slide. Additionally and or alternatively, interactive elements, such as magnification controls or measurement tools, may be available to analyze the first virtual slide 110 more precisely. In another non-limiting example, the display may include overlays or annotations 146 on the first virtual slide 110 to indicate areas flagged by the evaluation model 132, such as out-of-focus regions or areas requiring rescanning. Without limitation, the visual elements 116 may enhance user understanding and guide further actions, such as initiating the rescanning operation 126 or other further assessments.

With continued reference to FIG. 1, the processor may be configured to generate, using an assessment model 164, a predictive event 166 associated with a third visual element 168 as a function of the rescanned slide 140. As used in this disclosure, an "assessment model" is a computational model designed to analyze input data and generate evaluations, predictions, or recommendations to guide system operations or enhance decision-making. In an embodiment, the assessment model 164 may include algorithms or machine-learning models to generate the predictive event 166. As used in this disclosure, a "predictive event" is an occurrence generated by the apparatus, based on analysis performed by an assessment model 164, that anticipates an action, condition, or result and prompts a corresponding response or operation.

In an embodiment, the predictive event 166 may include the creation of a new visual element in the graphical user interface 108. In a non-limiting example, the assessment model 164 may analyze the rescanned slide 140 to detect patterns or anomalies that suggest further action, such as identifying regions where focus issues persist or highlighting new areas of interest that require additional rescanning or attention. Based on this analysis, the system generates a predictive event 166. For instance, if the model predicts that a specific region on the slide might contain diagnostically significant features, it could trigger a predictive event 166 to recommend further magnified scanning or annotation 146. Without limitation, the predictive event 166 may result in the creation of the third visual element 168 within the graphical user interface 108. For example, the apparatus may display a new notification, such as a highlighted button labeled "Rescan Region," or overlay an icon indicating the predicted area of interest 152. Continuing, the assessment model 164 may allow the apparatus to use insights from the rescanned slide 140 not only to improve the quality of current operations but also to anticipate and address potential needs, optimizing the overall workflow and user experience. Without limitation, the assessment model 164 may play a critical role by providing feedback based on analyzing data from the rescanned slide 140 to identify specific issues and provide actionable insights. Continuing, this process may involve leveraging algorithms, machine-learning techniques, or a combination of both to detect and classify problems that arise during the scanning or rescanning operations 126. The assessment model 164 may evaluate the rescanned slide 140 and annotate detected issues directly on the graphical representation 142. For example, without limitation, if a region of the slide remains out of focus or contains artifacts, the assessment model 164 may generate annotations 146 in the form of overlays or text labels, such as "Focus Error Detected" or "Artifact Observed." Continuing, these annotations 146 may guide users to problematic areas and suggest corrective actions. The assessment model 164 may compare the rescanned slide 140 against expected specimen or target datum 128, and compare dimensions or metadata, such as the slide preparation details. If the assessment model 164 determines that a significant portion of the specimen is absent, the assessment model 164 may flag this condition as "Specimen Missing" and generate the predictive event 166 to recommend rescanning or verifying the slide placement. In cases where the scanning device 112 fails to detect any specimen during rescanning, the assessment model 164 may use image recognition techniques to confirm the absence of tissue or sample material. The assessment model 164 may then generate a notification, such as "No Specimen Detected," prompting users to check the slide loading or specimen preparation. Without limitation, if the specimen is detected but parts of it were excluded from the whole slide imaging (WSI) process, the assessment model 164 may identify these unscanned regions by analyzing boundary discrepancies or alignment errors. Without limitation, the assessment model 164 may highlight these areas in the graphical interface and suggest adjustments to the scanning parameters 160 to include the missing regions. The assessment model 164 may evaluate focal depth across the slide to identify regions that remain out of focus after rescanning. Using techniques such as edge sharpness analysis or texture detection, the model can generate annotations 146 like "Focus Adjustment Needed" and recommend changes to the stack size 162 or focal settings. For stitching errors or other artifact issues that arise during the creation of WSI, the assessment model 164 may analyze pixel inconsistencies, alignment mismatches, or visual distortions. The assessment model 164 may flag these areas with annotations 146, such as "Artifact Detected," and propose rescanning the affected regions with adjusted stitching parameters 160 or enhanced quality settings. The outputs of the assessment model 164 may be seamlessly integrated into the graphical user interface 108 as visual elements like highlighted areas, annotated text, or interactive buttons. Continuing, the visual elements may provide users with an intuitive way to understand and act on the feedback, ensuring that the rescanning process is efficient and effective. Without limitation, the assessment model 164 may enable a robust feedback mechanism, improving the accuracy and reliability of slide imaging and analysis workflows.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2A:
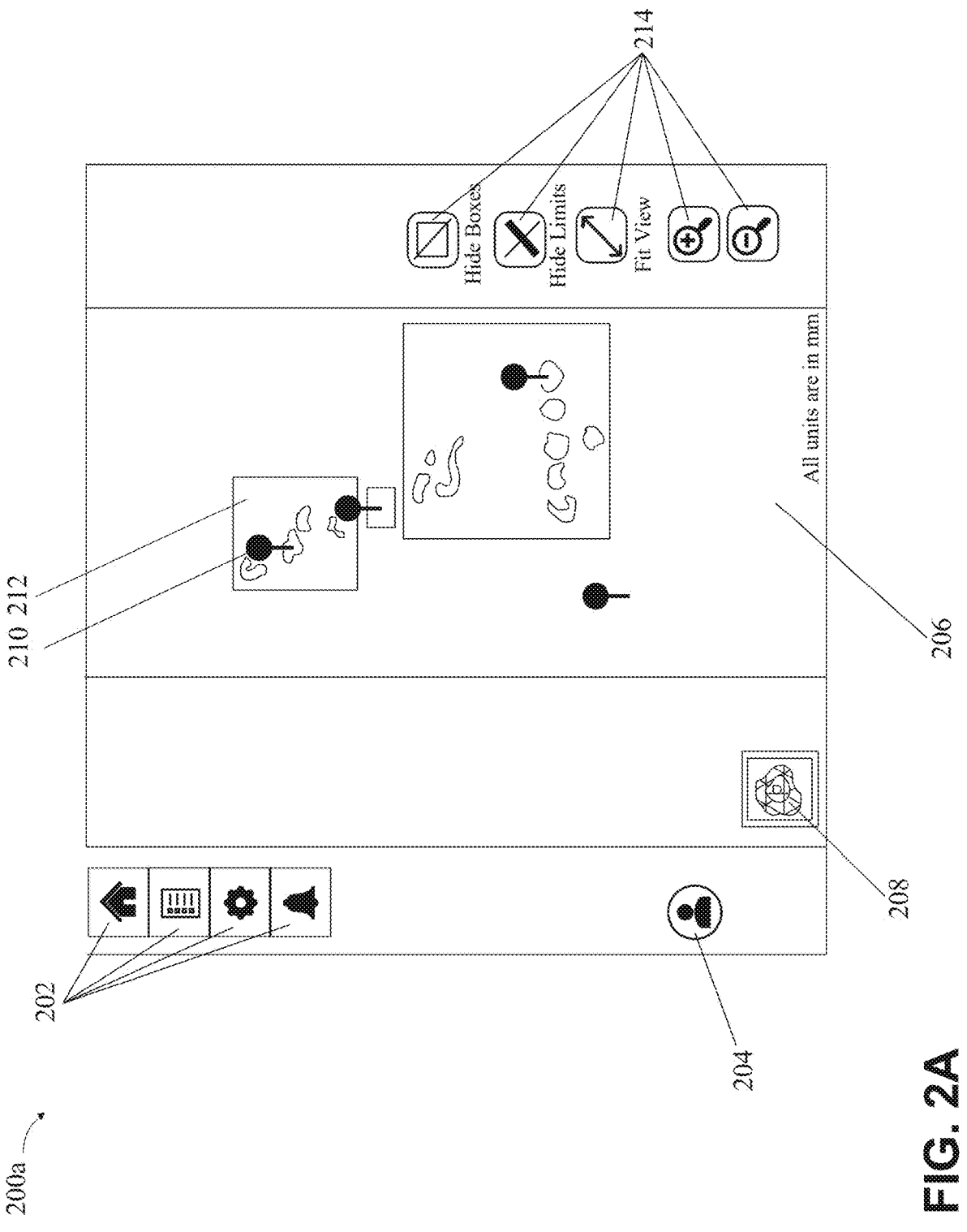
FIG. 2A-B is an exemplary illustration of a graphical user interface.
Figure 2B:
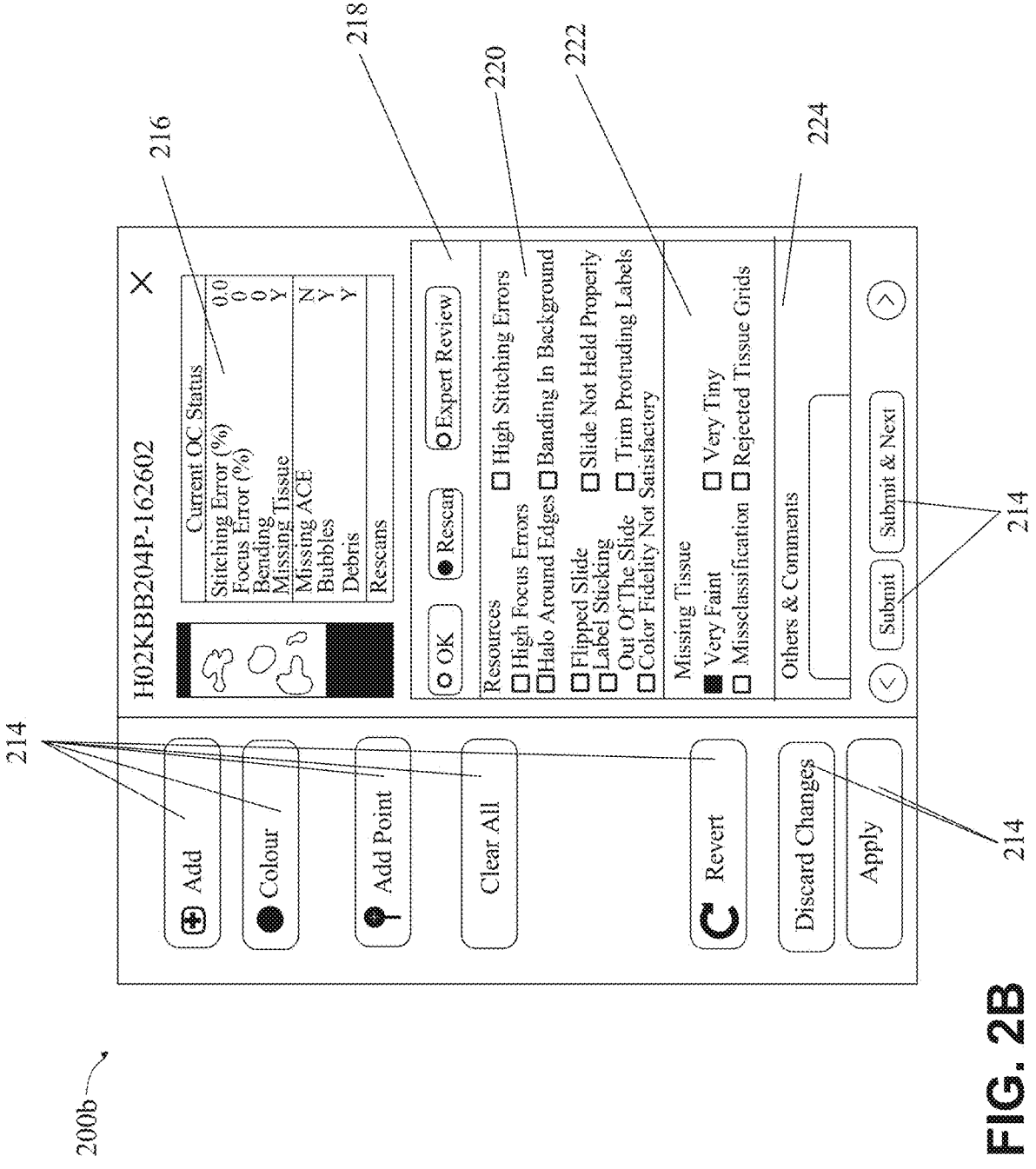

Referring now to FIG. 2A-B, an exemplary illustration 200*a*-*b* of a graphical user interface. In an embodiment, FIG. 2A may represent the left side of the graphical user interface. In an embodiment, FIG. 2B may represent the right side of the graphical user interface. In an embodiment, the illustration 200*a*-*b* includes menu elements 202. As used in this disclosure, "menu elements" are graphical components within the graphical user interface that provide a list or grid of options, commands, or features, enabling users to navigate and interact with the system or perform specific actions. In an embodiment, the illustration 200*a*-*b* includes a profile icon 204. As used in this disclosure, a "profile icon" is a graphical representation that identifies a user, group, or entity within the graphical user interface. In an embodiment, the profile icon 204 may serve as an interactive element to access user-specific settings, preferences, or account-related features. In an embodiment, the illustration 200*a*-*b* includes a first window 206. As used in this disclosure, a "first window" is a defined section or pane within the graphical user interface that displays specific content, data, or tools, providing a workspace or area for user interaction or visualization. In an embodiment, the illustration 200*a*-*b* includes a corner visual 208. As used in this disclosure, a "corner visual" is a graphical element positioned in the corner of the graphical user interface, which may serve aesthetic, functional, or informational purposes. In an embodiment, the illustration 200*a*-*b* includes data visualization tools 210. As used in this disclosure, "data visualization tools" are features or components within the graphical user interface that transform raw data into graphical formats. In a non-limiting example, the data visualization tools 210 may include charts, graphs, heatmaps, or overlays, enabling users to analyze and interpret information effectively. In an embodiment, the illustration 200*a*-*b* includes a frame 212. In an embodiment, the frame is a boundary or window within the graphical user interface that defines a specific area of interest, allowing users to isolate and interact with that region for detailed analysis, annotation, or rescanning. In an embodiment, the illustration 200*a*-*b* includes interactive elements 214. As used in this disclosure, "interactive elements" are graphical components within the graphical user interface. Interactive elements 214 may include as buttons, sliders, or icons, that respond to user actions, enabling interaction with the system to perform tasks or manipulate data. In an embodiment, the interactive elements may include buttons labeled "Discard Changes," "Apply," and "Revert," which may enable users to manage modifications to the displayed slide data. Additionally, features such as "Add Point," "Color," and "Clear All" may allow for dynamic annotation and editing of visual elements on the slide. Other interactive elements 214 may include graphical elements such as limits or bounding boxes for identified areas may also be toggled using controls like "Hide Limits" and "Hide Boxes." In another embodiment, the interactive elements 214 may feature tools such as "Fit View." In an embodiment, the illustration 200a-b includes a current status window 216. As used in this disclosure, a "current status window" is a graphical section within the interface that displays real-time information or metrics related to the system's operations. In an embodiment, the current status window 216 may include processing status, errors, or quality parameters. In an embodiment, the illustration 200a-b includes an event selection window 218. As used in this disclosure, an "event selection window" is a section of the graphical user interface that allows users to choose, filter, or manage events, such as actions, notifications, or tasks, for further processing or visualization. In an embodiment, the illustration 200a-b includes a resource menu 220. As used in this disclosure, a "resource menu" is a navigational component within the graphical user interface that provides access to system resources, tools, or settings, allowing users to manage configurations or access additional functionalities. In an embodiment, the illustration 200a-b includes a missing tissue menu 222. As used in this disclosure, a "missing tissue menu" is a specific component of the graphical user interface that highlights or lists regions of a slide where tissue is absent, providing options for further action. Without limitation, the missing tissue menu 222 may include functions for annotation or rescanning. In an embodiment, the illustration 200a-b includes a text input window 224. As used in this disclosure, a "text input window" is a graphical section within the user interface that allows users to enter text-based information. In a non-limiting example, the text input window 224 may permit the user to provide annotations, search queries, or commands, to interact with or modify the system's operations.

Figure 3:
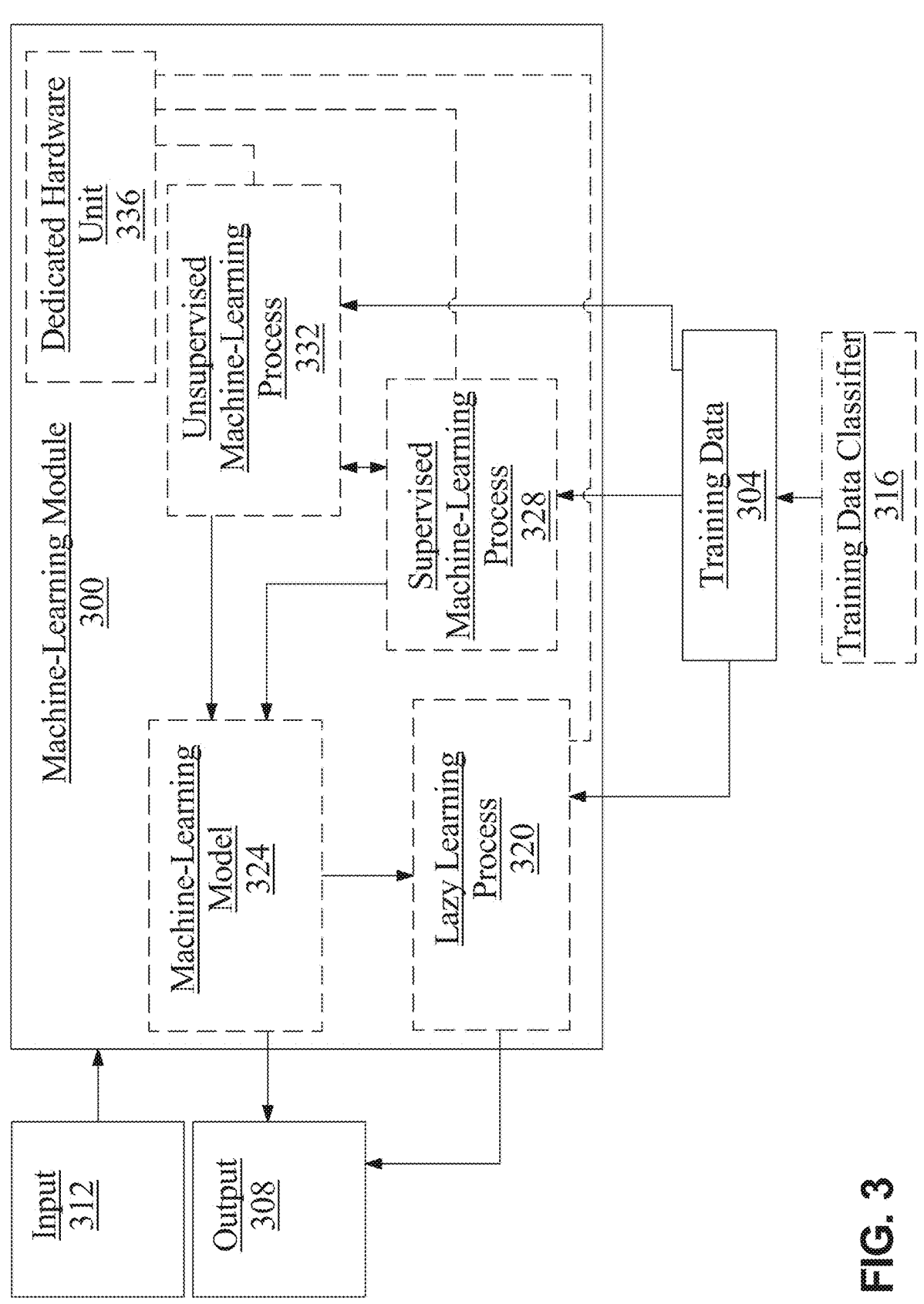
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include the frame and outputs may include an optimized frame.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categories of areas of interest on the virtual slide.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)÷P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include the frame as described above as inputs, the optimized frame as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
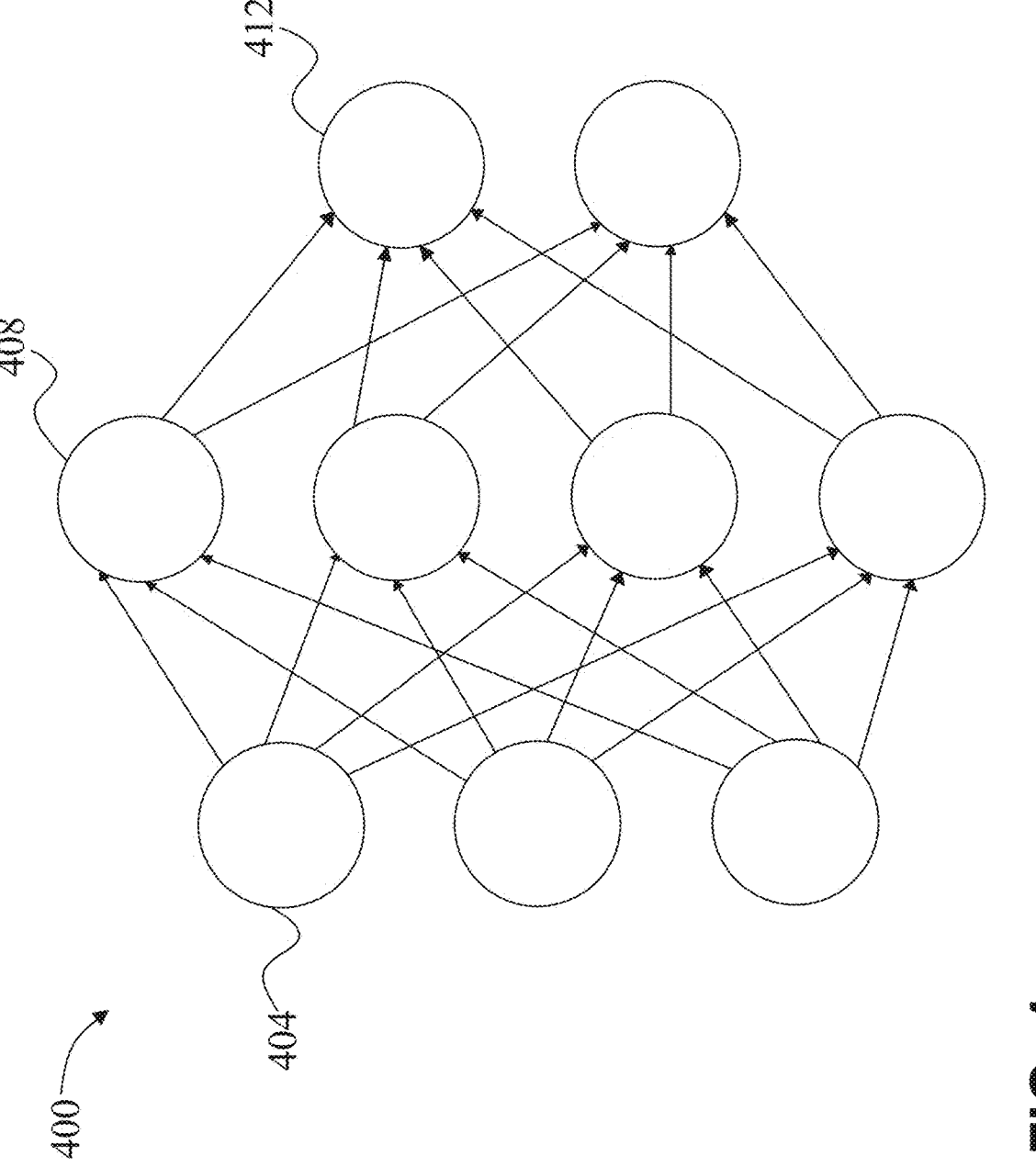
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
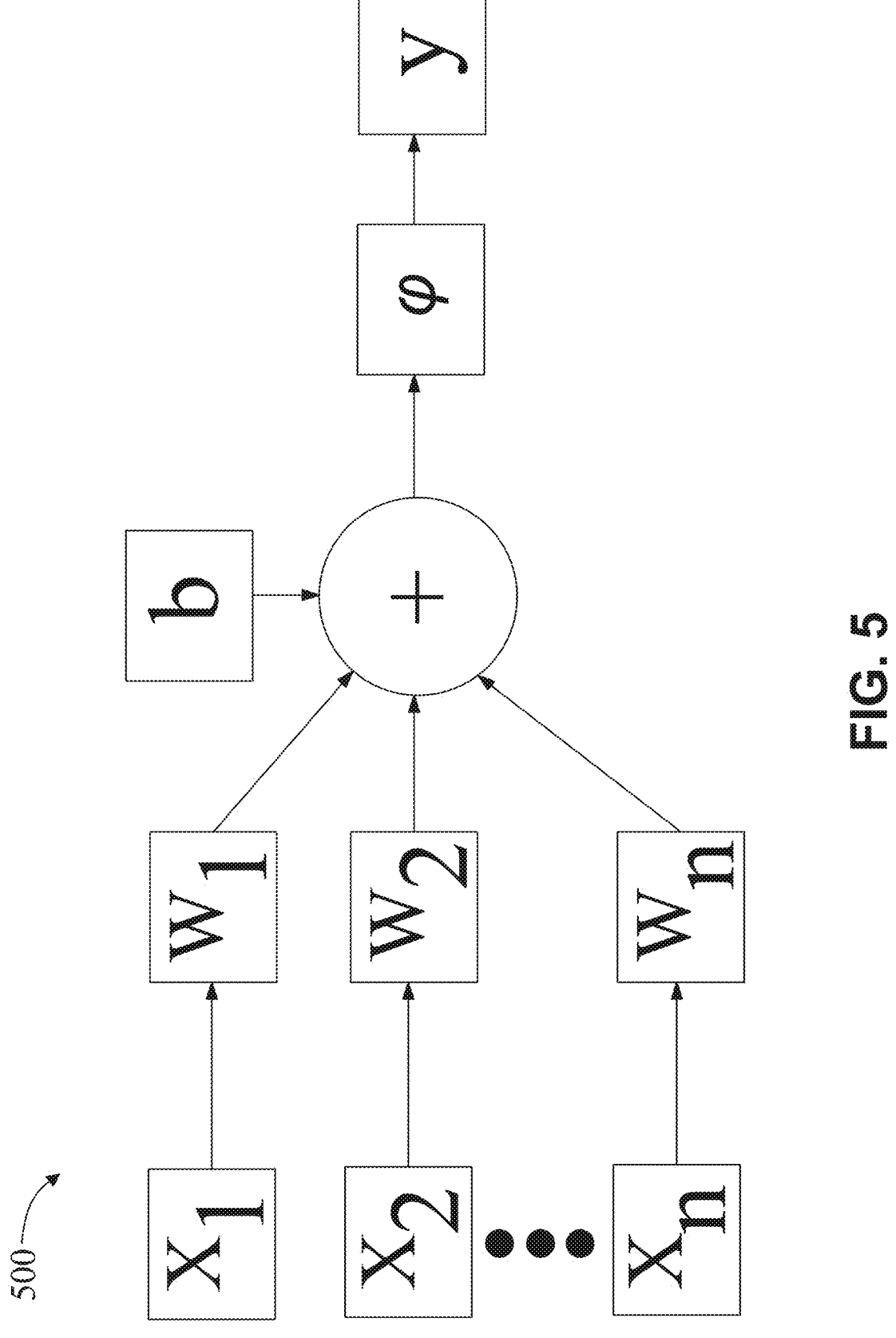
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 6, a flow diagram of an exemplary method 600 for control of rescanning a slide in a graphical user interface is illustrated. At step 605, method 600 includes receiving, using at least a processor, a first virtual slide from a scanning device. This may be implemented as described and with reference to FIGS. 1-5.

Still referring to FIG. 6, at step 610, method 600 includes generating a display data structure, wherein generating the display data structure further comprises providing a plurality of visual elements associated with a plurality of events and at least an event handler, wherein a first visual element of the plurality of visual elements is associated with a first event of the plurality of events, a second visual element of the plurality of visual elements is associated with a second event comprising user input, and the second event is configured to trigger a rescanning operation using the scanning device as a function of the user input. In an embodiment, the first event may be received from an evaluation model, the first event comprising an error notification, wherein the error notification is presented in the graphical user interface as highlighted elements. In an embodiment, the second event may include selecting, using a frame, an area of interest of the first virtual slide and triggering the rescanning operation based on the area of interest. In an embodiment, the apparatus may further include a frame optimizer, wherein the frame optimizer is configured to receive the frame and resize the frame as a function of the area of interest. In an embodiment, the second event may include selecting, using a sample point feature in the graphical user interface, a specific location on the first virtual slide and triggering, based on the sample point, the rescanning operation. In an embodiment, the rescanning operation may include modifying at least a parameter of the scanning device as a function of the first event. In an embodiment, modifying the at least a parameter of the scanning device may include determining that the first virtual slide is out of focus and adjusting, as a function of the first virtual slide being out of focus, a stack size. This may be implemented as described and with reference to FIGS. 1-5.

Still referring to FIG. 6, at step 615, method 600 includes displaying, using a graphical user interface of a display device, the first virtual slide. In an embodiment, the processor may generate, using an assessment model, a predictive event associated with a third visual element as a function of the rescanned slide. This may be implemented as described and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
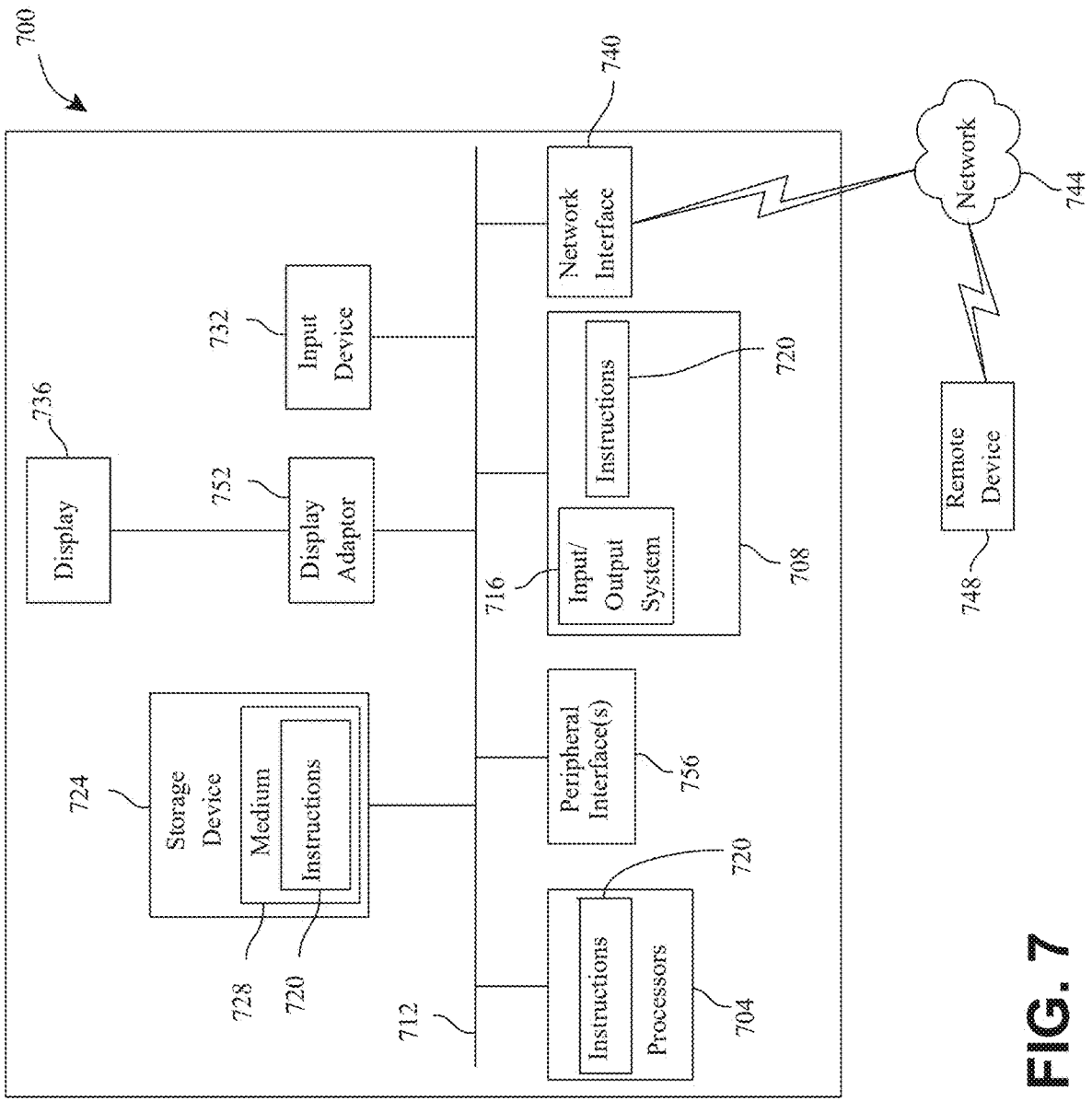
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for control of rescanning a biological microscopy slide in a graphical user interface, wherein the apparatus comprises:

a display device, wherein the display device is configured to display a graphical user interface;

a memory; and at least a processor communicatively connected to the memory, wherein the memory contains instructions configuring the at least a processor to:

receive a first virtual slide from a scanning device, wherein the first virtual slide comprises a digital representation of the biological microscopy slide;

generate a display data structure, wherein generating the display data structure further comprises:

providing a plurality of visual elements associated with a plurality of events and at least an event handler, wherein:

a first visual element of the plurality of visual elements is associated with a first event of the plurality of events; and a second visual element of the plurality of visual elements is associated with a second event comprising a user input, wherein the user input comprises a selection of an area of interest;

trigger a rescanning operation using the scanning device as a function of the user input by:

modifying one or more scanning parameters of the scanning device as a function of the area of interest; and generating a rescanned slide by rescanning the biological microscopy slide using the scanning device; and display, using the graphical user interface of the display device, the rescanned slide.

2. The apparatus of claim 1, wherein the first event is received from an evaluation model, the first event comprising an error notification, wherein the error notification is presented in the graphical user interface as highlighted elements.

3. The apparatus of claim 1, wherein the at least a processor is configured to generate a modified display data structure based on the rescanned slide.

4. The apparatus of claim 3, wherein generating the modified display data structure comprises:

receiving, using the at least a processor, the rescanned slide from the scanning device; and providing a graphical representation of the rescanned slide within the graphical user interface.

5. The apparatus of claim 3, wherein generating the modified display data structure further comprises:

generating a graphical comparison of the rescanned slide and the first virtual slide; and identifying, using an annotation of the plurality of visual elements, a difference between the rescanned slide and the first virtual slide.

6. The apparatus of claim 1, wherein the second event comprises:

selecting, using a frame, the area of interest of the first virtual slide; and triggering the rescanning operation based on the selected area of interest.

7. The apparatus of claim 6, wherein the processor is further configured to adjust the frame using frame optimizer, wherein using the frame optimizer comprises:

receiving the frame; and resizing the frame as a function of the area of interest.

8. The apparatus of claim 1, wherein the rescanning operation comprises modifying at least a parameter of the scanning device as a function of the first event.

9. The apparatus of claim 8, wherein modifying the at least a parameter of the scanning device comprises:

determining that the first virtual slide is out of focus; and adjusting, as a function of the first virtual slide being out of focus, a stack size.

10. The apparatus of claim 1, wherein the processor is further configured to generate, using an assessment model, a predictive event associated with a third visual element as a function of the rescanned slide.

11. A method for control of rescanning a biological microscopy slide in a graphical user interface, wherein the method comprises:

receiving, using at least a processor, a first virtual slide from a scanning device, wherein the first virtual slide comprises a digital representation of the biological microscopy slide;

generating, using the at least a processor, a display data structure, wherein generating the display data structure further comprises:

providing a plurality of visual elements associated with a plurality of events and at least an event handler, wherein:

a first visual element of the plurality of visual elements is associated with a first event of the plurality of events; and a second visual element of the plurality of visual elements is associated with a second event comprising user input, wherein the user input comprises a selection of an area of interest;

triggering, using the at least a processor, a rescanning operation using the scanning device as a function of the user input by:

modifying one or more scanning parameters of the scanning device as a function of the area of interest; and generating a rescanned slide by rescanning the biological microscopy slide using the scanning device; and displaying, using a graphical user interface of a display device, the rescanned slide.

12. The method of claim 11, wherein the first event is received from an evaluation model, the first event comprising an error notification, wherein the error notification is presented in the graphical user interface as highlighted elements.

13. The method of claim 11, wherein the at least a processor is configured to generate a modified display data structure based on the rescanned slide.

14. The method of claim 13, wherein generating the modified display data structure comprises:

receiving, using the at least a processor, the rescanned slide from the scanning device; and providing a graphical representation of the rescanned slide within the graphical user interface.

15. The method of claim 13, wherein the modified display data structure further comprises:

generating a graphical comparison of the rescanned slide and the first virtual slide; and identifying, using an annotation of the plurality of visual elements, a difference between the rescanned slide and the first virtual slide.

16. The method of claim 11, wherein the second event comprises:

selecting, using a frame, the area of interest of the first virtual slide; and triggering the rescanning operation based on the area of interest.

17. The method of claim 16, wherein the processor is further configured to adjust the frame using frame optimizer, wherein using the frame optimizer comprises:

receiving the frame; and resizing the frame as a function of the area of interest.

18. The method of claim 11, wherein the rescanning operation comprises modifying at least a parameter of the scanning device as a function of the first event.

19. The method of claim 18, wherein modifying the at least a parameter of the scanning device comprises:

determining that the first virtual slide is out of focus; and adjusting, as a function of the first virtual slide being out of focus, a stack size.

20. The method of claim 11, wherein the processor is further configured to generate, using an assessment model, a predictive event associated with a third visual element as a function of the rescanned slide.

\* \* \* \* \*